(12) United States Patent
Maruyama et al.

(10) Patent No.: US 10,672,161 B2
(45) Date of Patent: Jun. 2, 2020

(54) INCREASING READABILITY OF VISUALIZATION NODES

(71) Applicant: INTERNATIONAL BUSINESS MACHINES CORPORATION, Armonk, NY (US)

(72) Inventors: Daisuke Maruyama, Yamato (JP); Kenji Uchida, Tokyo (JP)

(73) Assignee: International Business Machines Coporation, Armonk, NY (US)

( * ) Notice: Subject to any disclaimer, the term of this patent is extended or adjusted under 35 U.S.C. 154(b) by 0 days.

(21) Appl. No.: 16/265,033

(22) Filed: Feb. 1, 2019

(65) Prior Publication Data

US 2019/0164321 A1 May 30, 2019

Related U.S. Application Data

(63) Continuation of application No. 15/069,396, filed on Mar. 14, 2016, now Pat. No. 10,235,782.

(51) Int. Cl.
| | |
|---|---|
| *G06F 3/048* | (2013.01) |
| *G06T 11/20* | (2006.01) |
| *G06F 3/0481* | (2013.01) |
| *G06F 40/177* | (2020.01) |
| *G06T 11/60* | (2006.01) |

(52) U.S. Cl.
CPC ........ *G06T 11/206* (2013.01); *G06F 3/04817* (2013.01); *G06F 40/177* (2020.01); *G06T 11/60* (2013.01); *G06T 2200/24* (2013.01)

(58) Field of Classification Search
CPC ... G06T 11/206; G06T 11/60; G06T 2200/24; G06F 40/177; G06F 3/04817

USPC .......................................................... 715/853
See application file for complete search history.

(56) References Cited

U.S. PATENT DOCUMENTS

| | | | |
|---|---|---|---|
| 8,402,395 B2 | 3/2013 | Borchardt et al. | |
| 8,502,823 B2 | 8/2013 | Moreno | |
| 8,711,147 B2 | 4/2014 | Breeds et al. | |
| 9,465,891 B1* | 10/2016 | Kagan | G06F 16/904 |

(Continued)

FOREIGN PATENT DOCUMENTS

JP    5511485    6/2014

OTHER PUBLICATIONS

Maruyama, et al., Pending U.S. Appl. No. 15/069,396, filed Mar. 14, 2016, titled "Increasing Readability of Visualization Nodes", pp. 1-44.

(Continued)

*Primary Examiner* — David Phantana-angkool
(74) *Attorney, Agent, or Firm* — Michael O'Keefe

(57) ABSTRACT

A method for generating a visualization connection line is presented. The method may include displaying, by a processor, a plurality of nodes on a computer visualization, whereby each node within the displayed plurality of nodes includes a plurality of scoring targets. The method may also include calculating an importance score for each scoring target within the plurality of scoring targets. The method may further include determining a connection line path between at least two related nodes within the displayed plurality of nodes based on the calculated importance score. The method may also include displaying a visualization connection line on the computer visualization along the determined connection line path.

18 Claims, 9 Drawing Sheets

(56) References Cited

U.S. PATENT DOCUMENTS

| | | | |
|---|---|---|---|
| 9,519,677 B2 | 12/2016 | Wong et al. | |
| 9,569,092 B2* | 2/2017 | Reed | G06F 3/0488 |
| 9,773,288 B2* | 9/2017 | Ananthanpillai | G06F 21/552 |
| 9,953,046 B2 | 4/2018 | Maruyama et al. | |
| 10,026,061 B2* | 7/2018 | Cheek | G06Q 10/105 |
| 10,235,782 B2* | 3/2019 | Maruyama | G06T 11/206 |
| 10,303,745 B2* | 5/2019 | Halpern | G06F 40/30 |
| 10,409,882 B2* | 9/2019 | Dey | G06F 3/04842 |
| 10,521,771 B2* | 12/2019 | Cheek | G06Q 10/105 |
| 2006/0053382 A1 | 3/2006 | Gardner et al. | |
| 2007/0044032 A1 | 2/2007 | Mollitor et al. | |
| 2011/0219324 A1* | 9/2011 | Watanabe | G06F 3/048 |
| | | | 715/771 |
| 2011/0307436 A1 | 12/2011 | Cai et al. | |
| 2013/0174074 A1 | 7/2013 | Strzygowski | |
| 2013/0205259 A1 | 8/2013 | Borchardt et al. | |
| 2015/0022527 A1* | 1/2015 | Madden | G06T 11/206 |
| | | | 345/440 |
| 2015/0324483 A1* | 11/2015 | Chun | G06Q 30/0281 |
| | | | 707/741 |
| 2016/0117058 A1* | 4/2016 | Maruyama | G06F 16/00 |
| | | | 715/854 |
| 2017/0263026 A1* | 9/2017 | Maruyama | G06T 11/206 |
| 2017/0263027 A1* | 9/2017 | Maruyama | G06F 3/04817 |
| 2018/0075073 A1* | 3/2018 | Maruyama | G06F 3/048 |

OTHER PUBLICATIONS

Maruyama, et al., Pending U.S. Appl. No. 15/480,446, filed Apr. 6, 2017, titled "Increasing Readability of Visualization Nodes", pp. 1-43.

Mell et al., "The NIST Definition of Cloud Computing," National Institute of Standards and Technology, Sep. 2011, p. 1-3, Special Publication 800-145.

Robotics Blog, "[Python] Route Search in the Potential Method," Robot Bulletin, Dec. 13, 2014, p. 1-13, http://robotics.blog.jp/python/ポテンシャル法, Accessed on Dec. 22, 2015.

Stanchak et al., "A Comparison of the Readability of Graphs Using Node-Link and Matrix-Based Representations," CMSC 734 Information Visualization Presentation, Spring 2007, 19 pages, University of Maryland, Department of Computer Science.

Wikipedia, "tf-idf," Wikipedia: the Free Encyclopedia, Last Modified on Feb. 9, 2016, p. 1-6, https://en.wikipedia.org/wiki/Tf-idf, Accessed on Mar. 2, 2016.

Yoshizawa, "Digital Image and Quantification," Bioinformatics Special Lecture, Aug. 3, 2011, p. 1-8, Kyushu University.

* cited by examiner

INCREASING READABILITY OF VISUALIZATION NODES

BACKGROUND

The present invention relates generally to the field of computing, and more particularly to data visualization.

Data visualization relates to representing data structures, such as databases, in a visual form to allow for readability and efficient understanding of the presented data. To display the data structures in a visual format, data visualization tools, such as graphing and modeling programs, may be implemented. The data visualization tools may create various data visualizations, such as graphs, models, charts, plots, and tables, in which to present the data. Additionally, the data visualization tools may allow users to manipulate the created visualization so that users can view the presented data from various perspectives. For example, a table may allow a user to filter out certain data below a desired threshold value.

SUMMARY

According to one embodiment, a method for generating a visualization connection line is provided. The method may include displaying, by a processor, a plurality of nodes on a computer visualization, whereby each node within the displayed plurality of nodes includes a plurality of scoring targets. The method may also include calculating an importance score for each scoring target within the plurality of scoring targets. The method may further include determining a connection line path between at least two related nodes within the displayed plurality of nodes based on the calculated importance score. The method may also include displaying a visualization connection line on the computer visualization along the determined connection line path.

According to another embodiment, a computer system for generating a visualization connection line is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include displaying a plurality of nodes on a computer visualization, whereby each node within the displayed plurality of nodes includes a plurality of scoring targets. The computer system may also include calculating an importance score for each scoring target within the plurality of scoring targets. The computer system may further include determining a connection line path between at least two related nodes within the displayed plurality of nodes based on the calculated importance score. The computer system may also include displaying a visualization connection line on the computer visualization along the determined connection line path.

According to yet another embodiment, a computer program product for generating a visualization connection line is provided. The computer program product may include one or more computer-readable storage devices and program instructions stored on at least one of the one or more tangible storage devices, the program instructions executable by a processor. The computer program product may include program instructions to display a plurality of nodes on a computer visualization, whereby each node within the displayed plurality of nodes includes a plurality of scoring targets. The computer program product may also include program instructions to calculate an importance score for each scoring target within the plurality of scoring targets. The computer program product may further include program instructions to determine a connection line path between at least two related nodes within the displayed plurality of nodes based on the calculated importance score. The computer program product may also include program instructions to display a visualization connection line on the computer visualization along the determined connection line path.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
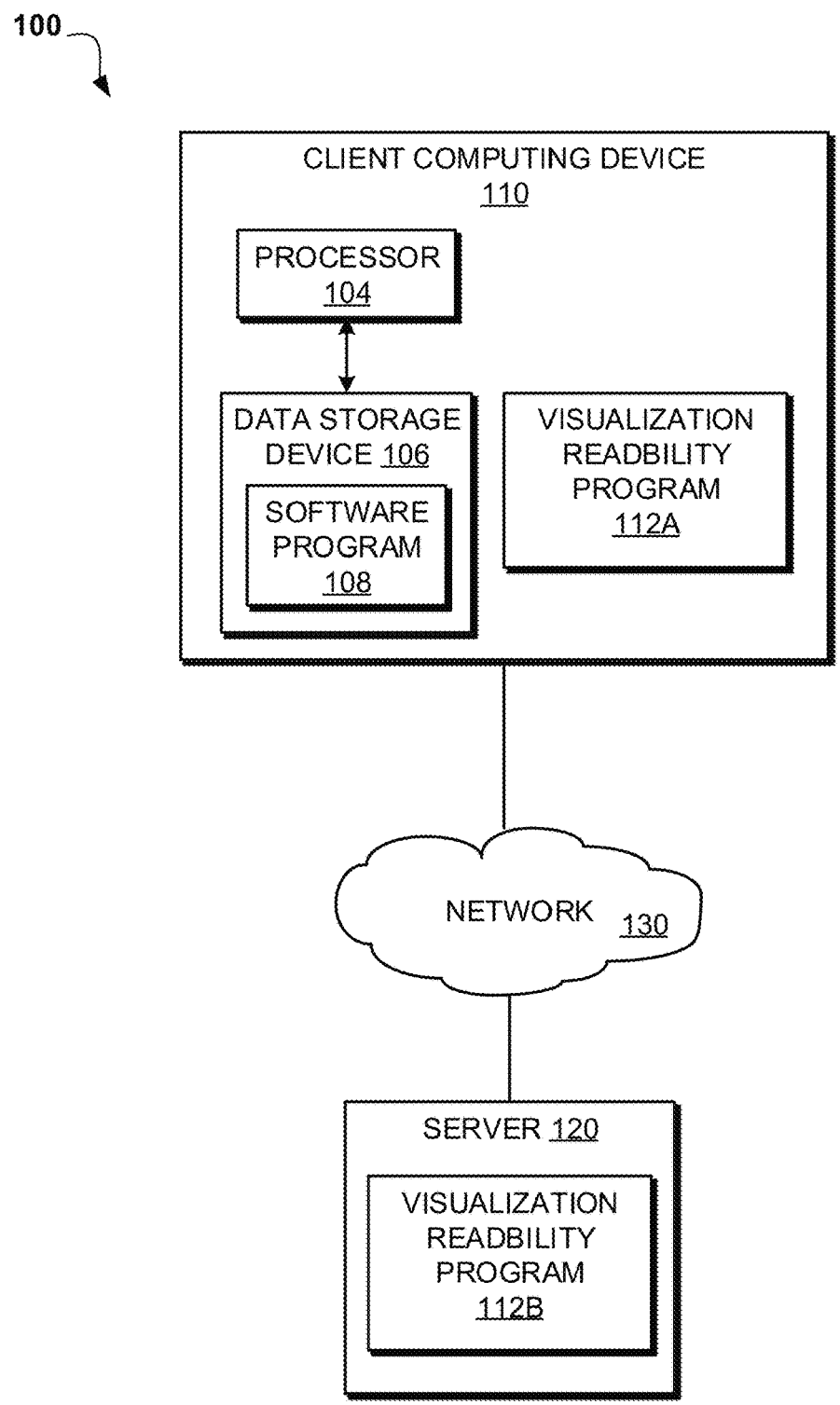
FIG. 1 illustrates an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to data visualization. The following described exemplary embodiments provide a system, method, and program product to, among other things, improve visibility and readability of data visualization by calculating an importance score for visualization nodes and node elements based on the uniqueness of each node and node element. Thereafter, connection lines may be adjusted when the calculated importance score meets or exceeds a preconfigured threshold value. More specifically, the present embodiment has the capacity to improve the technical field of data visualization by allow for reorganization of a data visualization without user intervention that increases user readability of the displayed data within the visualization.

As previously described, data visualization relates to representing data structures, such as databases, in a visual form to allow for readability and efficient understanding of the presented data. To display the data structures in a visual format, data visualization tools, such as graphing and modeling programs, may be implemented. The data visualization tools may create various data visualization, such as graphs, models, charts, plots, and tables, in which to present the data. The data visualization tools may allow users to manipulate the created visualization so that users can view the presented data from various perspectives.

Typical visualization tools may display nodes on each visualization to represent specific data points. The nodes may be grouped by node type, such as a requirement group or a test case group for engineering data. Nodes within a visualization may be linked by connection lines to show a flow within the visualization. For example, in a line graph comparing company performance for a number of years, the nodes for each year may be linked by connection lines such that a user can observe data trends. Each node may visualize a data object that includes a series of attributes, such as an object title, object status, object description, and a representing image.

Although visualization models created by visualization tools greatly aid users in understanding data structures, displaying data in a visualization model may be difficult for a user to comprehend due to the visibility of the displayed nodes and the connection lines linking the displayed nodes. The visibility issues may be related to the amount of data being presented. Similarly, visibility issues may arise regarding the arrangement of the nodes and connection lines in the visualization model. One correction method may involve redrawing connection lines so as to avoid nodes completely since the nodes themselves may not be moved due to node groups requiring similar nodes be displayed together. Unfortunately, redrawing connection lines may result in connection line paths that are difficult for a user to follow and impede user understanding of node relationships. As such, it may be advantageous, among other things, to implement a system that calculates the importance of each node element within a visualization and adjusts the connection lines between nodes based on the calculated importance so as to avoid certain node elements.

According to one embodiment, nodes of a similar type may be extracted and compared to each other. The differences between each node may be analyzed by calculating a score that represents the importance of a scoring target. A scoring target may relate to the smallest unit of an entity within the visualization for which an importance score is calculated. For example, each node, each element within each node, and characteristics of each node element, such as words within node elements and portions of images within node elements, may be scoring targets. The importance score of each scoring target may be calculated based on the uniqueness of each scoring target among all other scoring targets. If the importance score of a scoring target meets or exceeds a preconfigured threshold value, any connection lines that obscure a user's view of the scoring target may be adjusted. Adjusting the connection lines may include circumventing the scoring targets, giving transparency to a connection line when it passes over the scoring target, and passing the connection line under the scoring target.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product that calculates an importance score for each scoring element displayed within a visualization model. The calculated importance score may represent a scoring element's uniqueness among all other scoring targets displayed in the visualization model. When the calculated importance score for a scoring target meets or exceeds a threshold value, any connection line that obscures the view of the scoring target may be adjusted to improve user visibility of the scoring target.

Referring to FIG. 1, an exemplary networked computer environment 100 is depicted, in accordance with one embodiment. The networked computer environment 100 may include a client computing device 110 and a server 120 interconnected via a communication network 130. According to at least one implementation, the networked computer environment 100 may include a plurality of client computing devices 110 and servers 120, only one of each being shown for illustrative brevity.

The communication network 130 may include various types of communication networks, such as a wide area network (WAN), local area network (LAN), a telecommunication network, a wireless network, a public switched network and/or a satellite network. The communication network 130 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 110 may include a processor 104 and a data storage device 106 that is enabled to host a software program 108 and a Visualization Readability Program 112A and communicate with the server 120 via the communication network 130, in accordance with one embodiment of the invention. The client computing device 110 may be, for example, a mobile device, a telephone, a personal digital assistant, a netbook, a laptop computer, a tablet computer, a desktop computer, or any type of computing device capable of running a program and accessing a network. As will be discussed with reference to FIG. 7, the client computing device 110 may include internal components 702a and external components 704a, respectively.

The server computer 120 may be a laptop computer, netbook computer, personal computer (PC), a desktop computer, or any programmable electronic device capable of hosting a Visualization Readability Program 112B and communicating with the client computing device 110 via the communication network 130, in accordance with embodiments of the invention. As will be discussed with reference to FIG. 7, the server computer 120 may include internal components 702b and external components 704b, respectively. The server 120 may also operate in a cloud computing service model, such as Software as a Service (SaaS), Platform as a Service (PaaS), or Infrastructure as a Service (IaaS). The server 120 may also be located in a cloud computing deployment model, such as a private cloud, community cloud, public cloud, or hybrid cloud.

According to the present embodiment, the Visualization Readability Program 112A, 112B may be a program capable of calculating an importance score for each node and node element within a visualization and determination the path of connection lines between nodes based on the calculated importance score for each node and node element meeting or exceeding a preconfigured threshold value. The Visualization Readability Program 112A, 112B may be hosted on the client computing device 110 and/or on the server 120. Additionally, if the Visualization Readability Program 112A, 112B is hosted on both the client computing device 110 and the server 120, the functions of the Visualization Readability Program 112A, 112B may vary depending on the hosting device. For example, Visualization Readability Program 112A on the client computing device 110 may be responsible for visualization and user interaction functions while the Visualization Readability Program 112B on the server 120 may be responsible for calculation functions. The Visualization Readability Program 112A, 112B is explained in further detail below with respect to FIG. 3, FIG. 4, and FIG. 5.

Figure 2:
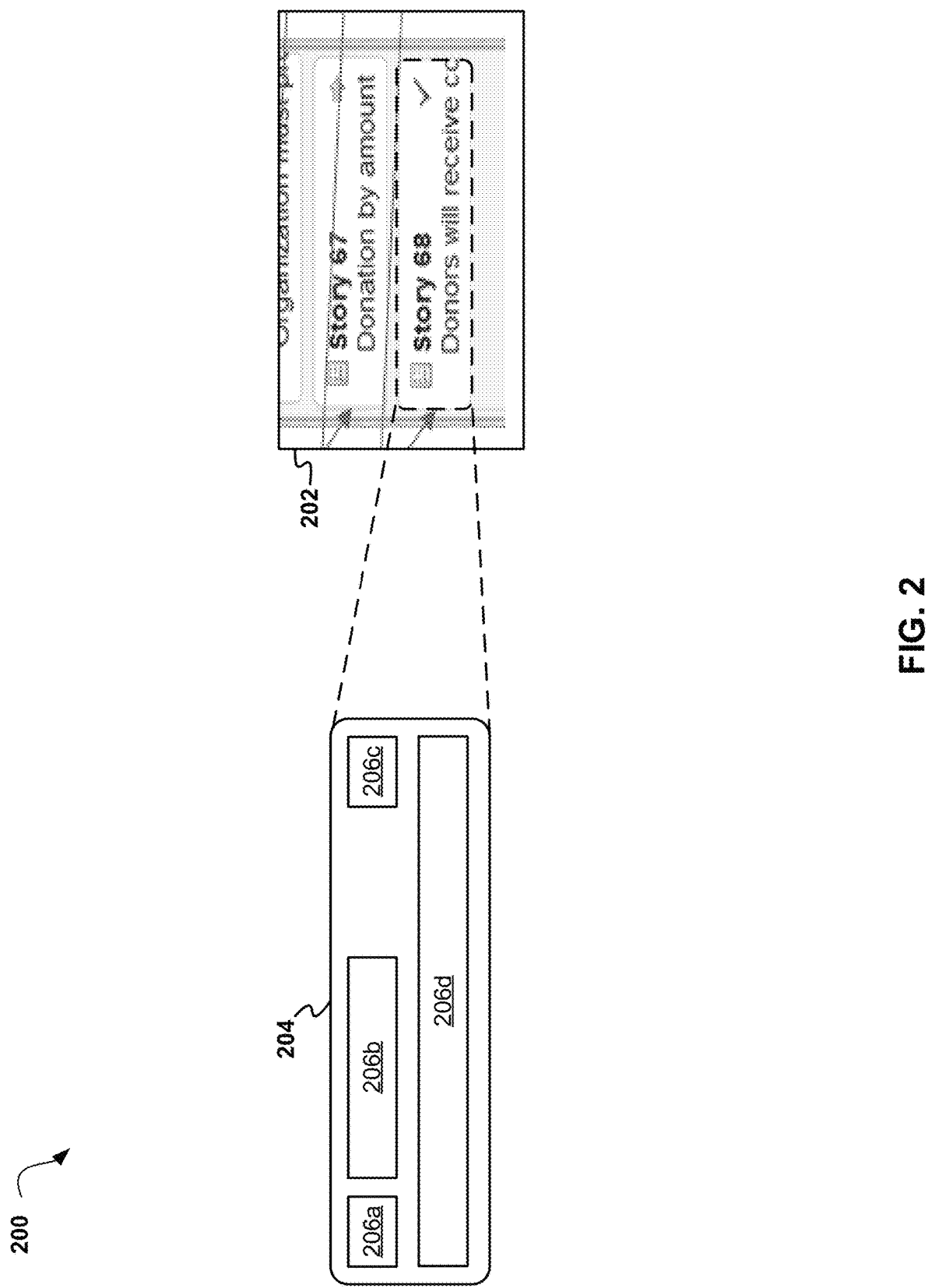
FIG. 2 is a functional block diagram of node element properties displayed within a visualization, in accordance with one embodiment of the present invention.

Referring now to FIG. 2, a functional block diagram 200 of node element properties displayed within a visualization is depicted, in accordance with one embodiment of the present invention. A visualization portion 202 may include one or more nodes, such as node 204. The node 204 may include a node definition and node elements 206a-d, such as a node type icon node element 206a, a node title text-type node element 206b, a node status icon node element 206c, and a node description text-type node element 206d. Each node element 206a-d may include a node element definition to be used to portray or describe a particular characteristic of the node to a user. For example, the node title text-type node element 206b may display a node title, such as "Story 68." Similarly, the node status icon node element 206c may display a green checkmark to indicate the node requirements have been satisfied.

Figure 3:
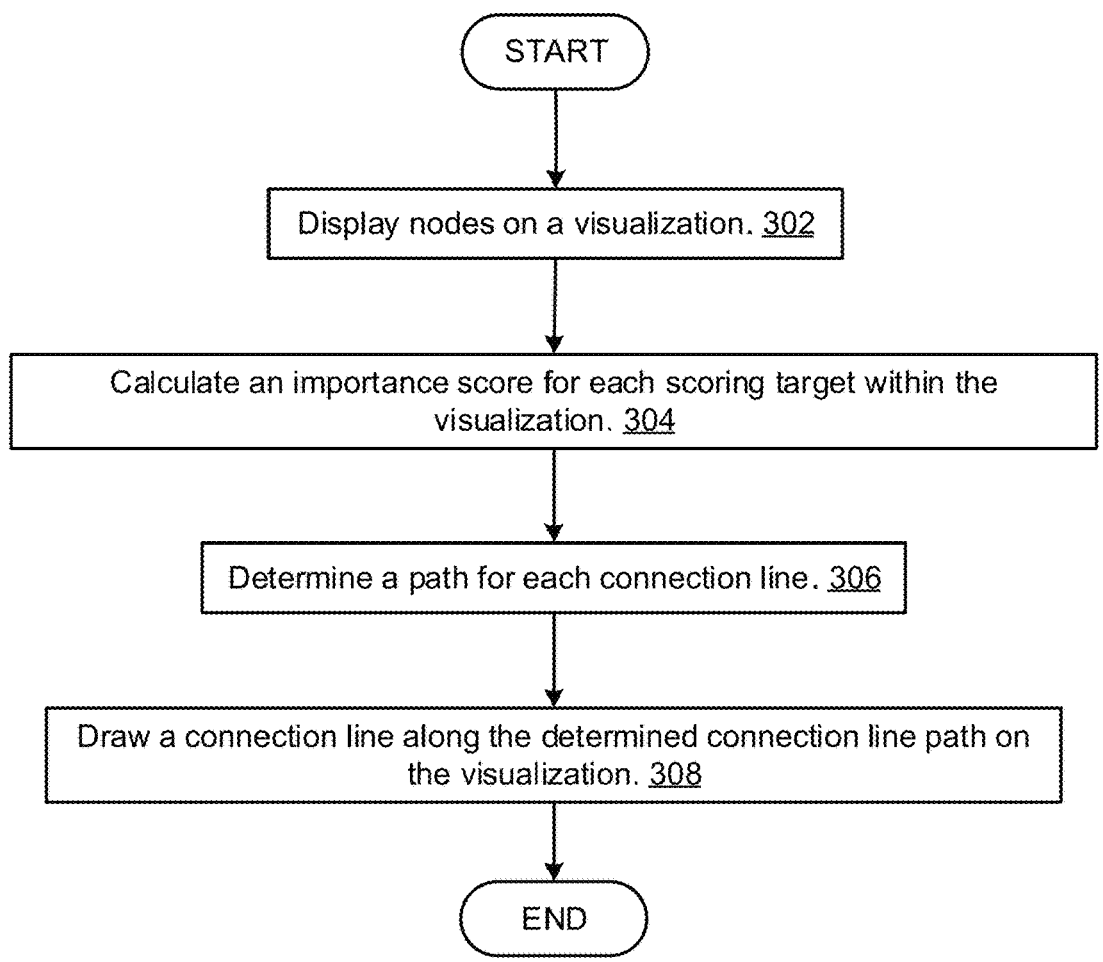
FIG. 3 is an operational flowchart illustrating a visualization readability process, in accordance with one embodiment of the present invention.

Referring now to FIG. 3, an operational flowchart illustrating a visualization readability process 300 is depicted, in accordance with one embodiment of the present invention. At 302, the Visualization Readability Program 112A, 112B (FIG. 1) displays nodes 204 (FIG. 2) on a visualization. In order to determine the importance score for each node 204 (FIG. 2) and each node element 206a-d (FIG. 2) represented on a visualization, the Visualization Readability Program 112A, 112B (FIG. 1) may display, or draw, nodes on a visualization using data provided by a user. For example, a user may provide the Visualization Readability Program 112A, 112B (FIG. 1) data associated with three categories, such as requirements, stories, and test cases. The Visualization Readability Program 112A, 112B (FIG. 1) may display nodes on a visualization that represent each data item. Furthermore, the Visualization Readability Program 112A, 112B (FIG. 1) may group each node within a particular category together so all nodes within the category are represented in one place.

Next at 304, the Visualization Readability Program 112A, 112B (FIG. 1) calculates an importance score for each scoring target within the visualization. As previously described, a scoring target may relate to the smallest unit of an entity within the visualization for which an importance score is calculated. Each node represented within the visualization may have subparts, or node elements. Furthermore, each node element may have different node element definitions, such as text or image portions. The Visualization Readability Program 112A, 112B (FIG. 1) may calculate an importance score for each scoring unit within the visualization. Additionally, the Visualization Readability Program 112A, 112B (FIG. 1) may base the calculation of the importance score for a scoring target on the node definition type of each node and each node element. For example, the Visualization Readability Program 112A, 112B (FIG. 1) may calculate an importance score differently based on whether a node element is text-based or image-based. Additionally, the importance score for a node element may be calculated based on an aggregation of the calculated importance score of each scoring target within the node element. Similarly, the importance score for a node may be calculated based on an aggregation of the calculated importance score of each node element within the node. In another embodiment the importance score for each node element and each node may be calculated based on an average of the importance score of each node element and each scoring target within the node and node element, respectively.

Furthermore, the Visualization Readability Program 112A, 112B (FIG. 1) may normalize the calculated importance score among each scoring target based on the algorithm utilized for creating each importance score within a node element definition type. The Visualization Readability Program 112A, 112B (FIG. 1) may adjust the scaling of each calculated importance score according to the node element type. For example, the Visualization Readability Program 112A, 112B (FIG. 1) may decrease the importance score for a status icon since a status icon may remain recognizable when a connection line is drawn over it. The node element importance score calculation process is explained in further detail below with respect to FIG. 4.

Then at 306, the Visualization Readability Program 112A, 112B (FIG. 1) determines a connection line path for each needed connection line of the visualization. Once an importance score for each node and each node element has been calculated, the Visualization Readability Program 112A, 112B (FIG. 1) determines a connection line path for each needed connection line within the visualization. As previously described, connection lines link nodes within a visualization. The connection lines may represent a relationship between the connected nodes. For example, if a visualization depicts drawn nodes grouped into a requirement category and a story category, a connection line may be drawn from a requirement node within the requirement category to a story node within the story category to represent that the story node linked to a requirement node shows a narrative description of the requirement.

When determining connection line paths for the visualization, the Visualization Readability Program 112A, 112B (FIG. 1) may calculate original connection paths where each connection line path does not avoid any nodes or node elements. Based on the calculated importance scores for the nodes and node elements, the Visualization Readability Program 112A, 112B (FIG. 1) may determine whether a connection line should avoid particular node or node element. The connection line path determination process is explained in further detail below with respect to FIG. 5.

Next at 308, the Visualization Readability Program 112A, 112B (FIG. 1) draws a connection line along the determined connection line path. Once the Visualization Readability Program 112A, 112B (FIG. 1) determines the connection line path for each connection line to be represented within the visualization, the Visualization Readability Program 112A, 112B (FIG. 1) may draw each connection line along the determined connection line path. For example, if the Visualization Readability Program 112A, 112B (FIG. 1) determined a connection line path should avoid a particular node in the visualization based on the calculated importance score for the node, then the Visualization Readability Program 112A, 112B (FIG. 1) would draw the connection line along the determined connection line path that avoids the particular node. Similarly, the Visualization Readability Program 112A, 112B (FIG. 1) may determine that the original connection line path for a connection line, where the connection line path does not avoid any nodes or node elements, is suitable based on the calculated importance score for each node and node element within the visualization. Therefore, the Visualization Readability Program 112A, 112B (FIG. 1) may draw the connection line along the original connection line path.

Figure 4:
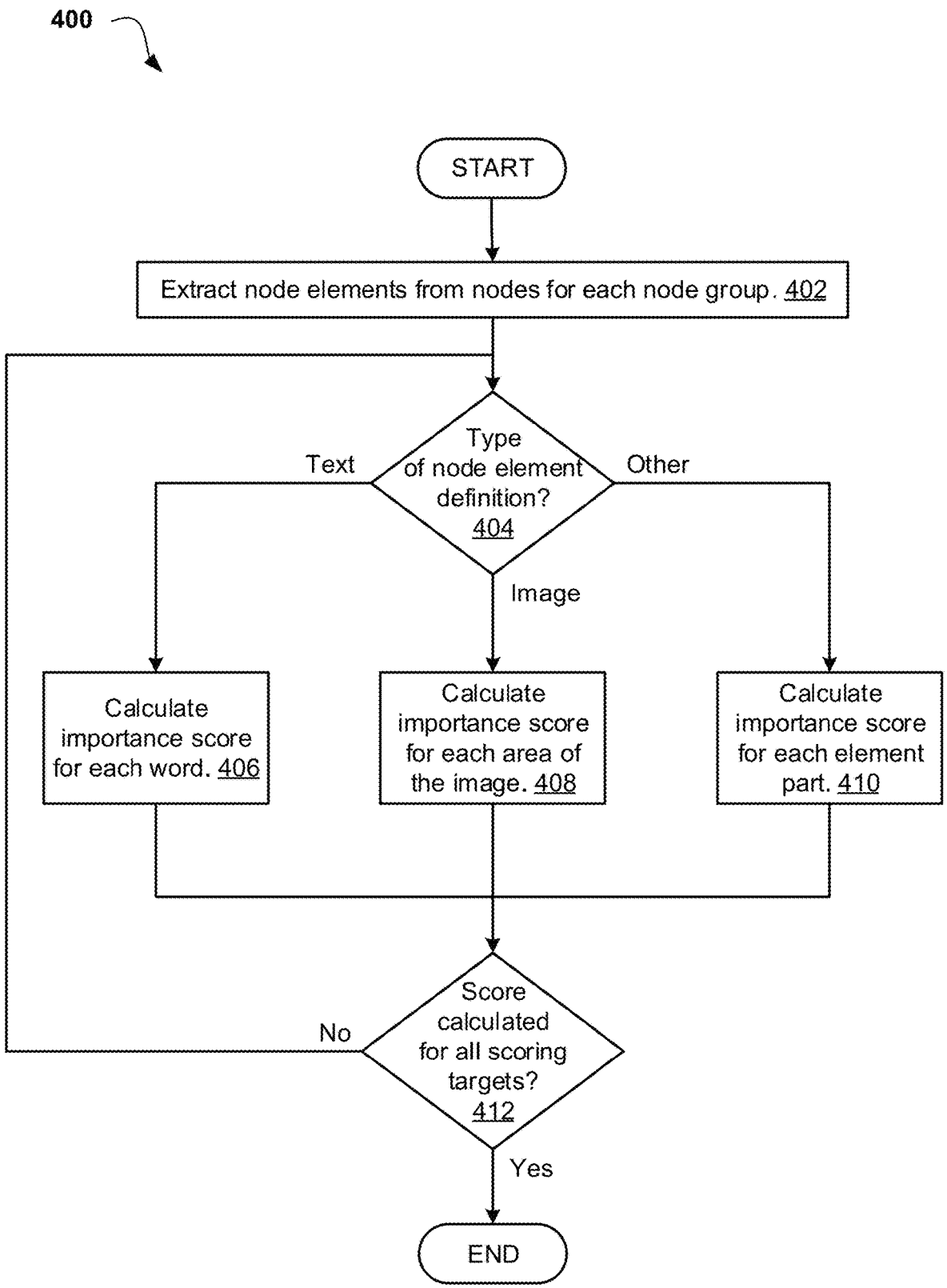
FIG. 4 is an operational flowchart illustrating a node element importance score calculation process, in accordance with one embodiment of the present invention.

Referring now to FIG. 4, an operational flowchart illustrating a node element importance score calculation process 400 is depicted, in accordance with one embodiment of the present invention. At 402, the Visualization Readability Program 112A, 112B (FIG. 1) extracts node elements 206a-d (FIG. 2) from nodes 204 (FIG. 2) within each node group. Each node within a visualization may include node elements 206a-d (FIG. 2). As previously described, node elements may be portions of nodes, such as enumeration constants, status icons, text boxes, and images. Since the Visualization Readability Program 112A, 112B (FIG. 1) may calculate an importance score for each node element within a node and each scoring target within each node element, the Visualization Readability Program 112A, 112B (FIG. 1) may extract each node element. For example, if a node drawn on a visualization includes a status icon image, a text box corresponding to the node title, and a text box corresponding to the node description, the Visualization Readability Program 112A, 112B (FIG. 1) may extract each of the three node elements in preparation for calculating a corresponding importance score for the status icon image, a node title text box, and the node description text box.

Then at 404, the Visualization Readability Program 112A, 112B (FIG. 1) determines the node element definition type for each node element. According to one implementation, the node importance score calculation process 400 continues along the operational flowchart depending on the node element definition type of each node element. Each node element may be associated with a node element definition, such as a text-type node element definition or an image-type node element definition. The node element definition may be determined based on the type of data contained within the node element. For example, if a node element contains an image file extension, the node element definition may relate to an image-type node element. Similarly, if a node element contains text or numerical values, the node element definition may relate to a text-type node element definition. Depending on the node element definition associated with a node element, the Visualization Readability Program 112A, 112B (FIG. 1) may calculate the importance score for the node element using a different approach. If the Visualization Readability Program 112A, 112B (FIG. 1) determines the node element definition is a text-type node element definition (step 404, "Text" branch), the Visualization Readability Program 112A, 112B (FIG. 1) may continue to step 406 to calculate the importance of each word within the node element. If the Visualization Readability Program 112A, 112B (FIG. 1) determines the node element definition is an image-type node element definition (step 404, "Image" branch), the Visualization Readability Program 112A, 112B (FIG. 1) may advance to step 408 to calculate importance of each area of the image. If the Visualization Readability Program 112A, 112B (FIG. 1) determines the node element definition is neither a text-type node element definition nor an image-type node element definition (step 404, "Other" branch), the Visualization Readability Program 112A, 112B (FIG. 1) may advance to step 410 to calculate the importance of each node element.

Next at 406, the Visualization Readability Program 112A, 112B (FIG. 1) calculates an importance score for each text-type node element. Scoring targets associated with a text-type node element may include each sentence, phrase, word, or letter of text within the text-type node element. To calculate the importance score for each scoring target within a text-type node element, the Visualization Readability Program 112A, 112B (FIG. 1) may implement text analyzation techniques, such as term frequency-inverse document frequency (TF-IDF). TF-IDF may utilize numerical statistics to determine word importance across the entire body of an entity, such as a visualization. Additionally, the Visualization Readability Program 112A, 112B (FIG. 1) may determine the importance of each scoring target within the text-type node element and adjust the importance score based on the uniqueness of each scoring target. For example, if a text-type node element includes a unique word whose only appearance within the entire visualization is within the text-type node element, the Visualization Readability Program 112A, 112B (FIG. 1) may calculate a high importance score for the scoring target and the text-type node element.

Then at 408, the Visualization Readability Program 112A, 112B (FIG. 1) calculates an importance score for each scoring target within the image-type node element. Scoring targets associated with an image-type node element may include characteristic objects within the image-type node element. Characteristic objects within an image-type node element may relate to portions or areas of the node element. For example, a characteristic object of an image-type node element may relate to the lower right quadrant of an image-type node element. Similarly, a characteristic object may relate to a specific feature of the image-type node element. For example, if the image-type node element depicts an arrow on a white background, the arrow within the image-type node element may be extracted as a characteristic object by the Visualization Readability Program 112A, 112B (FIG. 1).

To calculate the importance score for an image-type node element, the Visualization Readability Program 112A, 112B (FIG. 1) may extract characteristic objects of the node element to serve as scoring targets. Additionally, the Visualization Readability Program 112A, 112B (FIG. 1) may calculate an importance score for each extracted area of the node element based on the uniqueness of the characteristic object within the visualization. The Visualization Readability Program 112A, 112B (FIG. 1) may calculate a lower importance score for scoring targets with multiple instances within the visualization. Conversely, scoring targets with only one instance within the visualization may receive a high calculated importance score. Furthermore, the Visualization Readability Program 112A, 112B (FIG. 1) may set the importance score for the entire image-type node element based on the calculated importance score of one scoring target within the image-type node element. For example, the importance score for the entire image-type node element may be set as the highest calculated importance score among all scoring targets or the lowest calculated importance score among all scoring targets.

Next at 410, the Visualization Readability Program 112A, 112B (FIG. 1) calculates an importance score for each scoring target within node elements that are not text-type or image-type node elements. When the Visualization Readability Program 112A, 112B (FIG. 1) determines a node element is not a text-type node element or an image-type node element, the node element may be considered an other-type node element. An other-type node element may be one of a variety of node element types, such as an enumeration constant, a status icon, or a number field. Scoring targets associated with an other-type node element may include parts of each element, such as a portion of a status icon or a single digit within a number field. To calculate the importance score of scoring targets within other-type node elements, the Visualization Readability Program 112A, 112B (FIG. 1) may implement a variety of typical analyzation techniques, such as TF-IDF. For example, the Visualization Readability Program 112A, 112B (FIG. 1) may determine a status icon within a visualization is an other-type node element. Therefore, the Visualization Readability Program 112A, 112B (FIG. 1) may analyze the status icon as a scoring target and determine the importance of the status icon based on the status icon's uniqueness within the visualization. If the status icon only appears once within the visualization, the Visualization Readability Program 112A, 112B (FIG. 1) may calculate a high importance score for the status icon. Conversely, if the status icon appears multiple times within the visualization, the Visualization Readability Program 112A, 112B (FIG. 1) may calculate a lower importance score for the status icon.

Then at 412, the Visualization Readability Program 112A, 112B (FIG. 1) determines whether an importance score has been calculated for all scoring targets within the visualization. According to one implementation, the node importance score calculation process 400 may continue along the operational flowchart if an importance score has been calculated for all scoring targets within the visualization. The Visualization Readability Program 112A, 112B (FIG. 1) may determine that an importance score has been calculated for all scoring targets if each scoring target depicted within the visualization has an associated importance score. If the Visualization Readability Program 112A, 112B (FIG. 1) determines an importance score has not been calculated for all scoring targets within the visualization (step 412, "No" branch), the Visualization Readability Program 112A, 112B (FIG. 1) may return to step 404 to determine the node element definition type of a node element. If the Visualization Readability Program 112A, 112B (FIG. 1) determines an importance score has been calculated for all scoring targets within the visualization (step 412, "Yes" branch), the node element importance score calculation process 400 may terminate and the visualization readability process 300 (FIG. 3) may continue to step 306.

Figure 5:
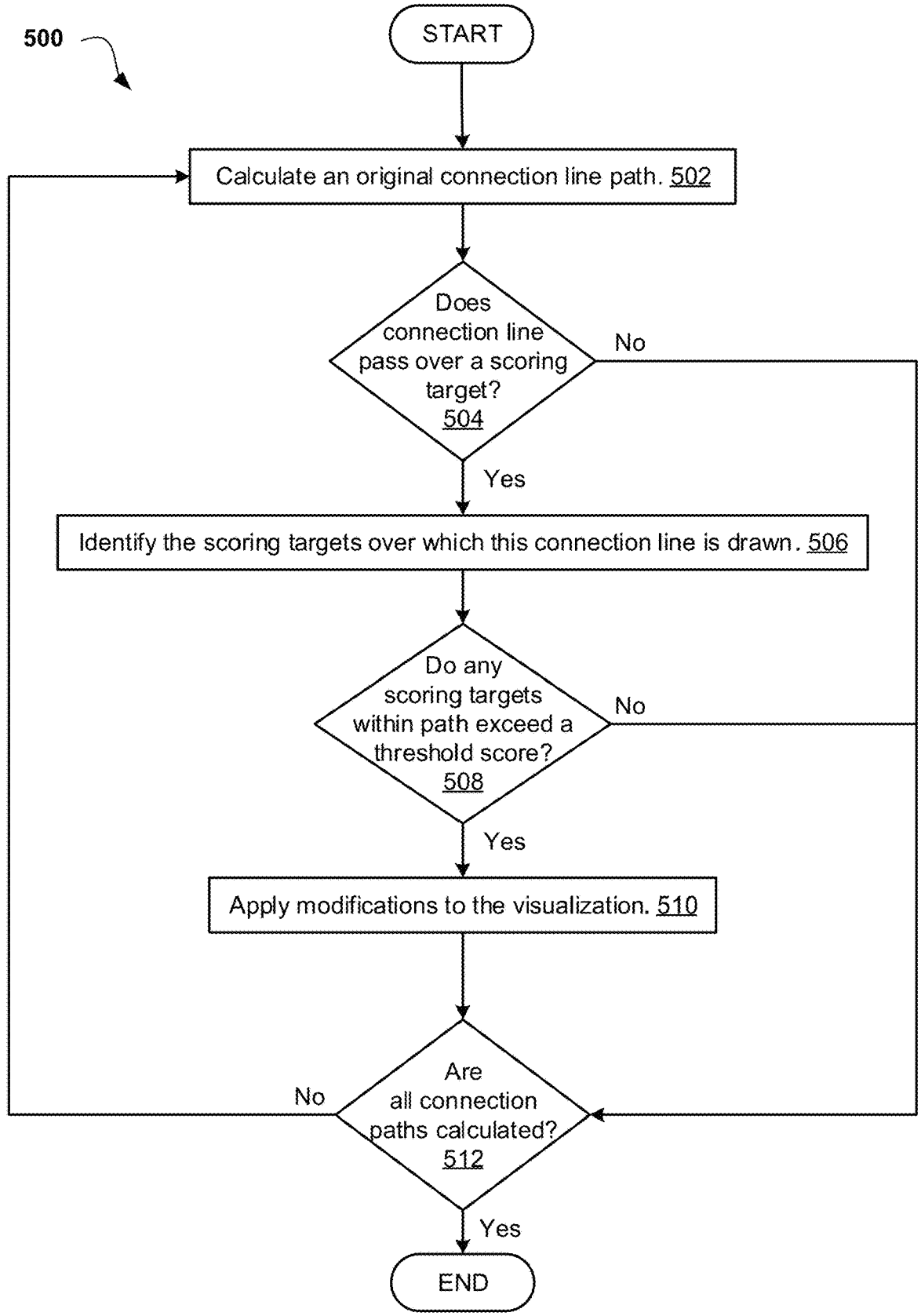
FIG. 5 is an operational flowchart illustrating a connection line path determination process, in accordance with one embodiment of the present invention.

Referring now to FIG. 5, an operational flowchart illustrating a connection line path determination process 500 is depicted, in accordance with one embodiment of the present invention. At 502, the Visualization Readability Program 112A, 112B (FIG. 1) calculates an original connection line path. As previously described, connection lines may be connection devices between visualization nodes. An original connection line may relate to a connection line whose path travels directly to a destination object on the visualization while not avoiding any scoring targets. For example, an original connection line path may be a connection line path that traverses directly over a scoring element, thereby obscuring a user's view of the scoring element or otherwise affecting the readability of the scoring element. The Visualization Readability Program 112A, 112B (FIG. 1) may calculate an original connection line path to determine whether the original connection line path should be adjusted to avoid obscuring the readability of high importance score scoring targets.

Next at 504, the Visualization Readability Program 112A, 112B (FIG. 1) determines whether the connection line passes over a scoring target. According to one implementation, the connection line path determination process 500 may continue along the operational flowchart, if the connection line passes over a scoring target. The Visualization Readability Program 112A, 112B (FIG. 1) may determine a connection line passes over a scoring target if the connection line obscures a user's view of the scoring target. The Visualization Readability Program 112A, 112B (FIG. 1) may be capable of determining whether a user's view of the scoring target is obscured by a connection line through image recognition technology. If the Visualization Readability Program 112A, 112B (FIG. 1) determines the connection line passes over a scoring target (step 504, "Yes" branch), the Visualization Readability Program 112A, 112B (FIG. 1) may continue to step 506 to identify the scoring targets over which the connection line is drawn. If the Visualization Readability Program 112A, 112B (FIG. 1) determines the connection line does not pass over a scoring target (step 504, "No" branch), the Visualization Readability Program 112A, 112B (FIG. 1) may continue to step 512 to determine whether all original connection paths of the visualization have been calculated.

Then at 506, the Visualization Readability Program 112A, 112B (FIG. 1) identifies the scoring targets over which the connection line is drawn. If the original connection line path passes over any scoring targets, the Visualization Readability Program 112A, 112B (FIG. 1) may identify the scoring targets that are passed over, or traversed. For example, if an original connection line path travels over a text box en route to a destination element, the Visualization Readability Program 112A, 112B (FIG. 1) may identify the text box as a scoring element over which the original connection line path traverses.

Next at 508, the Visualization Readability Program 112A, 112B (FIG. 1) determines whether the importance score of any scoring targets within the calculated original connection line path meet or exceed a threshold value. According to one implementation, the method may continue along the connection line path determination process 500, if the importance score of any scoring targets within the calculated original connection line path meet or exceed a user preconfigured threshold value. If the Visualization Readability Program 112A, 112B (FIG. 1) determines the importance score of a scoring target within the calculated original connection line path meets or exceeds a threshold value (step 508, "Yes" branch), the Visualization Readability Program 112A, 112B (FIG. 1) may continue to step 510 to apply modifications to the visualization. If the Visualization Readability Program 112A, 112B (FIG. 1) determines no importance scores of any scoring targets within the calculated original connection line path meet or exceed a threshold value (step 508, "No" branch), the Visualization Readability Program 112A, 112B (FIG. 1) may continue to step 512 to determine whether all original connection paths of the visualization have been calculated. The Visualization Readability Program 112A, 112B (FIG. 1) may not adjust original connection line paths that traverse over low importance score scoring targets, such as scoring targets with importance scores below the preconfigured threshold, since low importance scoring targets may not be unique or important to visualization readability. For example, if a status icon is partially obscured by a connection line yet the status icon is unobscured in other places on the visualization, a user reading the visualization may be able to determine the identity of the obscured status icon based on the obscured status icon's similarity to the unobscured status icons.

Then at 510, the Visualization Readability Program 112A, 112B (FIG. 1) modifies the original connection line path to avoid the identified scoring targets. If any scoring target over which the original connection line path traverses has an importance score meeting or exceeding the user preconfigured threshold, the Visualization Readability Program 112A, 112B (FIG. 1) may modify the original connection line path to avoid the corresponding scoring targets. Therefore, the modified connection line path may connect the two related node elements while also avoid obscuring any high importance scoring targets. The Visualization Readability Program 112A, 112B (FIG. 1) may modify the original connection line path by circumventing the high importance scoring target by a preconfigured distance, increasing connection line transparency when the connection line passes over the high importance scoring target, reducing the display priority of the connection line, or drawing the connection line under the high importance scoring target. Reducing the display priority of the connection line may relate to a feature within the visualization software that places other elements on top of the connection line, thereby hiding the connection line behind the other elements.

Next at 512, the Visualization Readability Program 112A, 112B (FIG. 1) determines whether all original connection paths of the visualization have been calculated. According to one implementation, the method may continue along the connection line path determination process 500, if all original connection paths of the visualization have been calculated. If the Visualization Readability Program 112A, 112B (FIG. 1) determines not all original connection paths of the visualization have been calculated (step 512, "No" branch), the Visualization Readability Program 112A, 112B (FIG. 1) may return to step 502 to calculate an original connection line path when the connection line does not avoid any scoring targets. If the Visualization Readability Program 112A, 112B (FIG. 1) determines all original connection paths of the visualization have been calculated (step 512, "Yes" branch), the connection line path determination process 500 may terminate and the visualization readability process 300 (FIG. 3) may continue to step 308.

It may be appreciated that FIG. 3, FIG. 4, and FIG. 5 provide only an illustration of one implementation and do not imply any limitations with regard to how different embodiments may be implemented. Many modifications to the depicted environments may be made based on design and implementation requirements.

Figure 6:
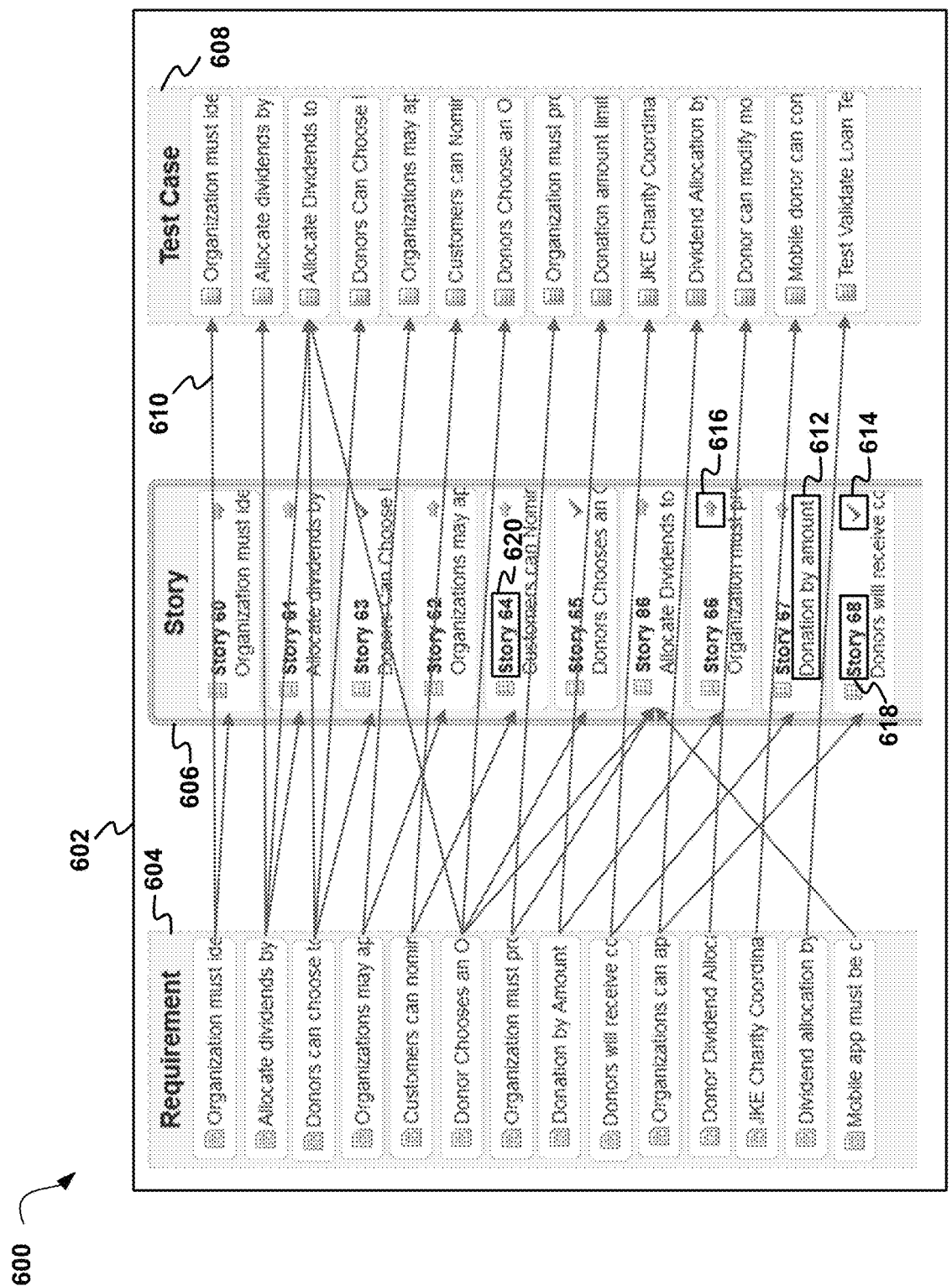
FIG. 6 is a decreased visibility functional block diagram, in accordance with one embodiment of the present invention.

Referring now to FIG. 6, a decreased visibility functional block diagram 600 is depicted, in accordance with one embodiment of the present invention. A visualization 602 may include requirement group 604, story group 606, and test case group 608. Each group may include visualization nodes that are connected to each other by connection lines, such as connection line 610. As previously described, connection lines (e.g. 610) may be connection devices between visualization nodes. Connection line 610 may be an original connection line since the connection line 610 path travels directly to a destination object on the visualization 602 while not avoiding any scoring targets. Scoring targets within the visualization 602 may include node elements 612-620.

The Visualization Readability Program 112A, 112B (FIG. 1) may calculate importance scores for all scoring targets, including node elements 612-620, within the visualization 602. If the calculated importance score for a node element 612-620 meets or exceeds a user preconfigured threshold value, the Visualization Readability Program 112A, 112B (FIG. 1) may modify the path of a connection line, such as connection line 610, to avoid obscuring the high importance scoring target. As previously described, the Visualization Readability Program 112A, 112B (FIG. 1) may modify the original connection line path by circumventing the high importance scoring target by a preconfigured distance, increasing connection line transparency when the connection line passes over the high importance scoring target, or passing the connection line under the high importance scoring target The Visualization Readability Program 112A, 112B (FIG. 1) may calculate high importance scores for scoring targets that are unique within the visualization 602. For example, since the language within the description node element 612 includes the unique phrase "Donation by amount," the Visualization Readability Program 112A, 112B (FIG. 1) may calculate a high importance score for the description node element 612. Similarly, node elements that appear multiple times within the visualization 602, such as checkmark status icon 614 and arrow status icon 616, may receive a low importance score, since unobscured instances of such elements may be present within the visualization to aid a user in identifying unclear, observed node elements. Furthermore, the importance score of node elements with common parts visible within the visualization 602 may be lowered. For example, "Story 68" title node element 618 and "Story 64" title node element 620 contain common portions of text. Therefore, the Visualization Readability Program 112A, 112B (FIG. 1) may lower the importance score for each node element when calculating an importance score since any obscured portions of these elements affecting node readability may be recognized through common parts with other node elements. For example, if the word "Story" illustrated in the text of "Story 68" title node element 618 was obscured by a connection line, a user may still be able to comprehend the word based on the presence of unobscured "Story 64" title node element 620. Therefore, adjusting the connection line that obscures "Story 68" title node element 618 may not be required to aid user readability of the visualization 602.

Figure 7:
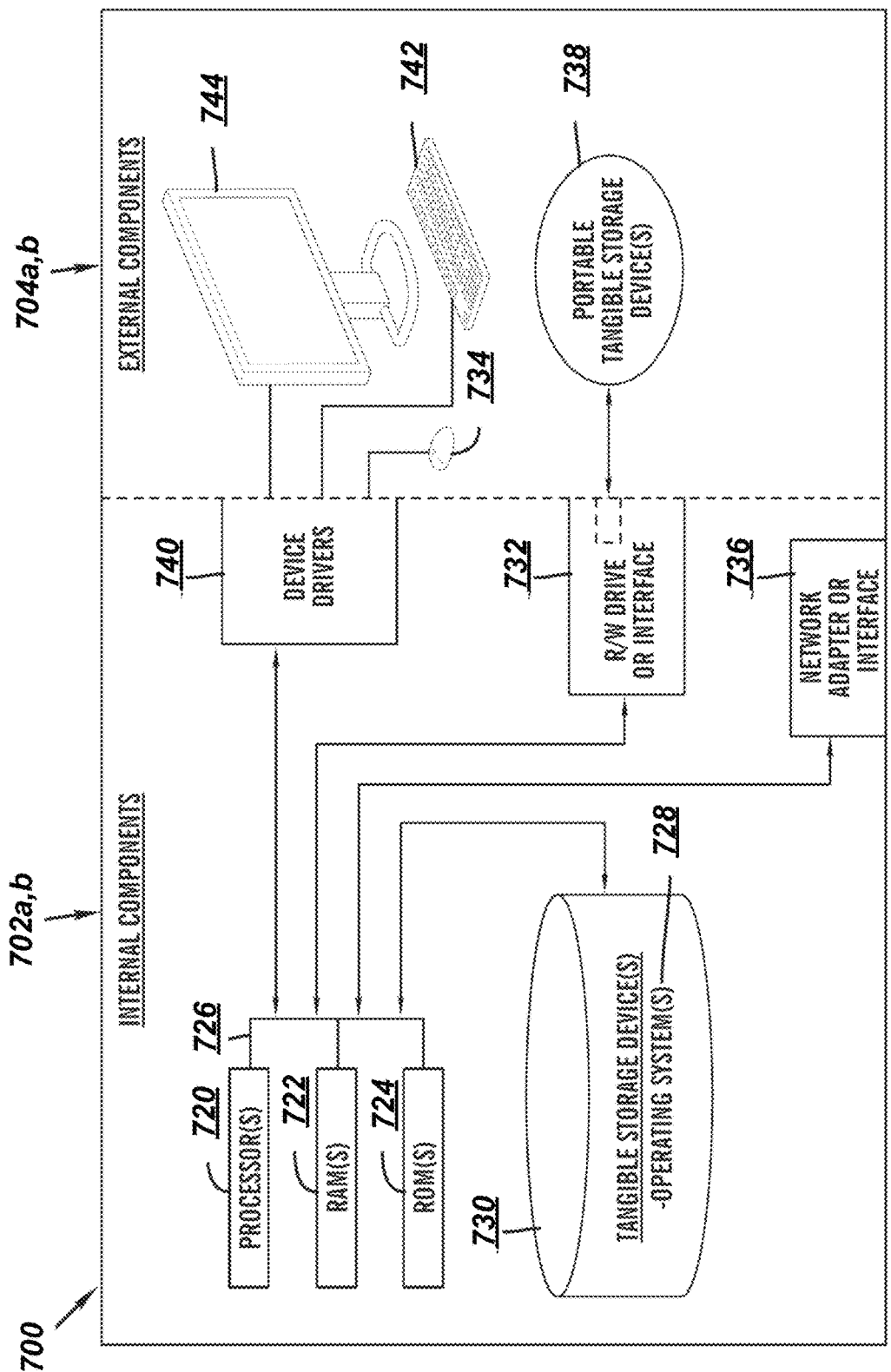
FIG. 7 is a block diagram of internal and external components of computers and servers depicted in FIG. 1 according to at least one embodiment.

FIG. 7 is a block diagram 700 of internal and external components of the client computing device 110 and the server 120 depicted in FIG. 1 in accordance with an embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

The data processing system 702, 704 is representative of any electronic device capable of executing machine-readable program instructions. The data processing system 702, 704 may be representative of a smart phone, a computer system, PDA, or other electronic devices. Examples of computing systems, environments, and/or configurations that may represented by the data processing system 702, 704 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 110 (FIG. 1) and the server 120 (FIG. 1) may include respective sets of internal components 702 a,b and external components 704 a,b illustrated in FIG. 7. Each of the sets of internal components 702 include one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the Visualization Readability Program 112A (FIG. 1) in the client computing device 110 (FIG. 1), and the Visualization Readability Program 112B (FIG. 1) in the server 120 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 702 a,b also includes a R/W drive or interface 732 to read from and write to one or more portable computer-readable tangible storage devices 738 such as a CD-ROM, DVD, memory stick, magnetic tape, magnetic disk, optical disk or semiconductor storage device. A software program, such as the Visualization Readability Program 112A, 112B (FIG. 1), can be stored on one or more of the respective portable computer-readable tangible storage devices 738, read via the respective R/W drive or interface 732, and loaded into the respective hard drive 730.

Each set of internal components 702 a,b also includes network adapters or interfaces 736 such as a TCP/IP adapter cards, wireless Wi-Fi interface cards, or 3G or 4G wireless interface cards or other wired or wireless communication links. The Visualization Readability Program 112A (FIG. 1) in the client computing device 110 (FIG. 1) and the Visualization Readability Program 112B (FIG. 1) in the server 120 (FIG. 1) can be downloaded to the client computing device 110 (FIG. 1) and the server 120 (FIG. 1) from an external computer via a network (for example, the Internet, a local area network or other, wide area network) and respective network adapters or interfaces 736. From the network adapters or interfaces 736, the Visualization Readability Program 112A (FIG. 1) in the client computing device 110 (FIG. 1) and the Visualization Readability Program 112B (FIG. 1) in the server 120 (FIG. 1) are loaded into the respective hard drive 730. The network may comprise copper wires, optical fibers, wireless transmission, routers, firewalls, switches, gateway computers and/or edge servers.

Each of the sets of external components 704 a,b can include a computer display monitor 744, a keyboard 742, and a computer mouse 734. External components 704 a,b can also include touch screens, virtual keyboards, touch pads, pointing devices, and other human interface devices. Each of the sets of internal components 702 a,b also includes device drivers 740 to interface to computer display monitor 744, keyboard 742, and computer mouse 734. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
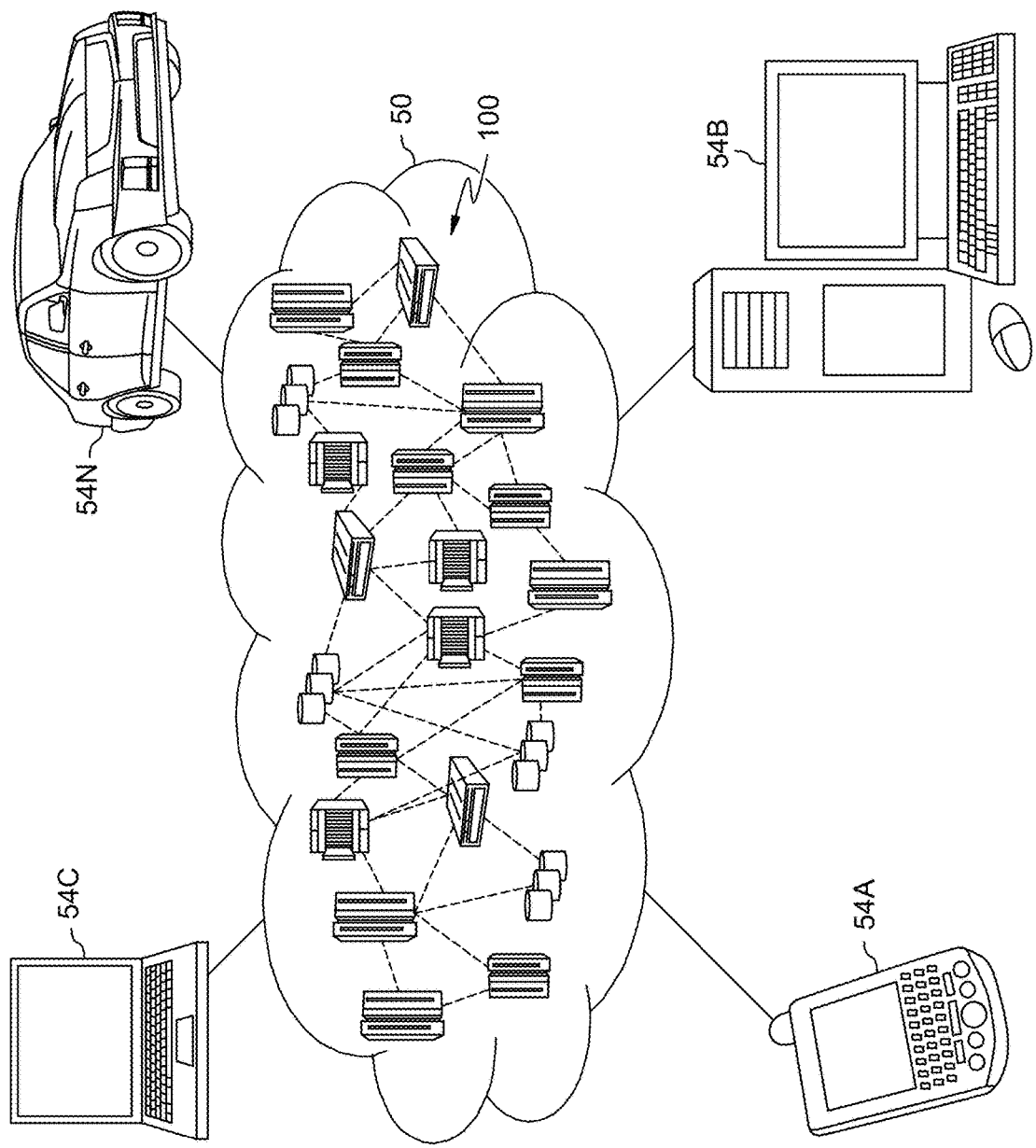
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 100 and cloud computing environment 50 can communicate with any type of computerized device over any type of network and/or network addressable connection (e.g., using a web browser).

Figure 9:
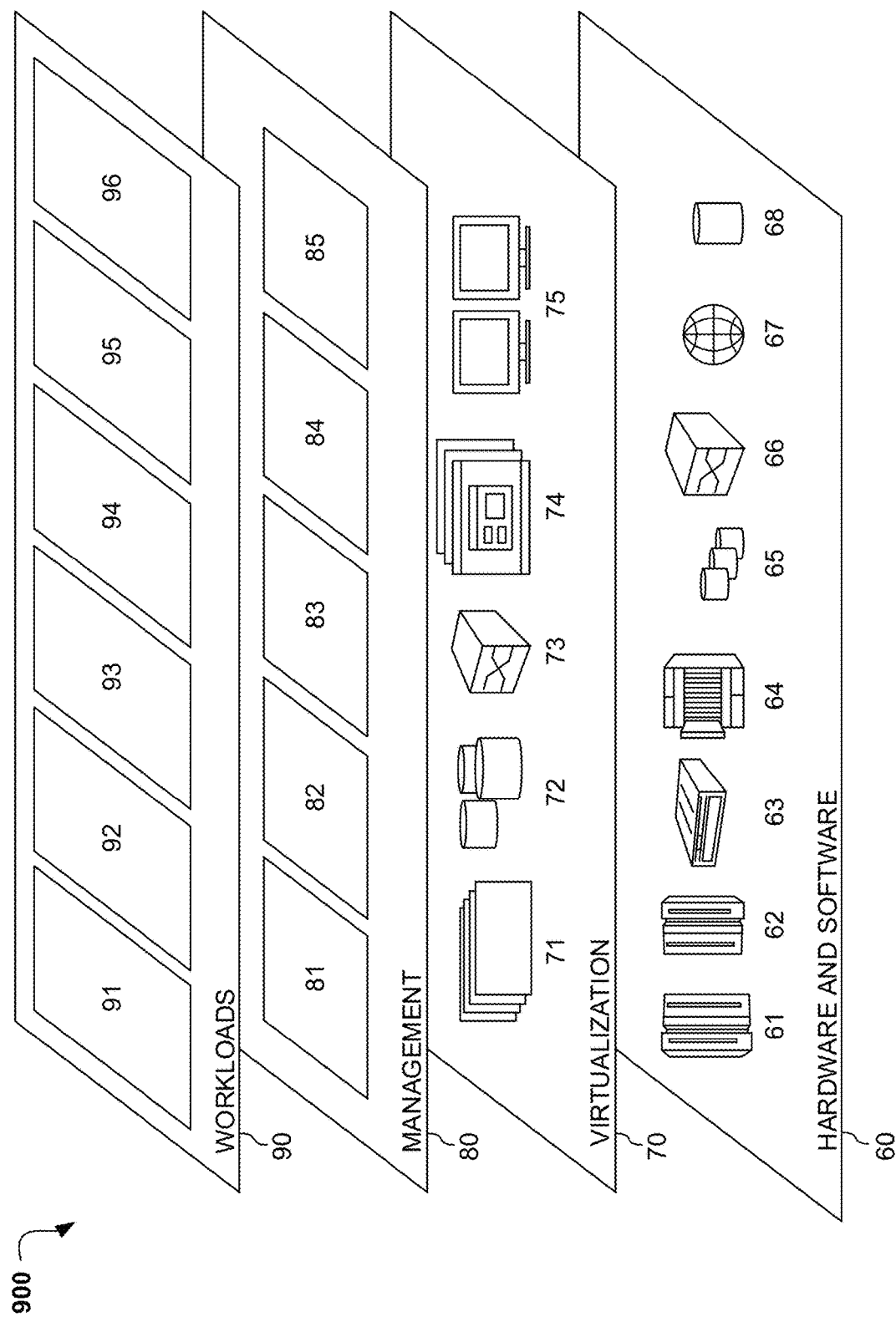
FIG. 9 depicts abstraction model layers according to an embodiment of the present invention.

Referring now to FIG. 9 a set of functional abstraction layers 900 provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and connection line readability generation 96. Connection line readability generation 96 may relate to drawing connection lines on a visualization based on a calculated importance score of each node and node element within a visualization so as to avoid obscuring unique and/or important nodes and node elements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for generating a visualization connection line, the method comprising:
   calculating an importance score for each scoring target within a plurality of scoring targets; and
   determining a connection line path between at least two related nodes among a plurality of nodes in a computer visualization based on the calculated importance score, wherein determining the connection line path further comprises:
      calculating an original connection line path;
      determining the original connection line path passes over a scoring target within the plurality of scoring targets;
      identifying the scoring target over which the calculated original connection line path passes based on determining that the original connection line path passes over the scoring target;
      determining the calculated importance score for the identified scoring target meets or exceeds a preconfigured threshold; and
      modifying the calculated original connection line path to avoid obscuring user readability of the identified scoring target.

2. The method of claim 1, wherein calculating the importance score further comprises:
   extracting a plurality of node elements from the displayed plurality of nodes, wherein each node element within the plurality of node elements is a scoring target within the plurality of scoring targets;

determining a node element definition for each node element within the plurality of extracted node elements; and calculating the importance score for each scoring target within the plurality of scoring targets based on the determined node element definition type.

3. The method of claim 2, wherein the node element definition comprises at least one of a text-type node element, an image-type node element, and an other-type node element, and wherein the other-type node element comprises at least one of an enumeration constant, a status icon, and a number field.

4. The method of claim 3, wherein the node element definition within the extracted plurality of node elements is at least one of a text-type node element, an image-type node element, and an other-type node element, and wherein the plurality of scoring targets comprises at least one of a sentence, a word, a phrase, and a letter within the text-type node element.

5. The method of claim 4, wherein the text-type node element displays a plurality of characters comprising at least one of a sentence, a word, a phrase, a letter, and a number within the text-type node element, and wherein the image-type node element displays a file with a file extension associated with an image, and wherein the other-type node element displays a plurality of data that is not related to the text-type node element or the image-type node element.

6. The method of claim 1, wherein modifying the calculated original connection line path comprises at least one of circumventing the identified scoring target by a preconfigured distance, increasing a connection line transparency when the calculated original connection line path passes over the identified scoring target, reducing a display priority of the connection line, and drawing the original connection line path underneath the identified scoring target.

7. A computer system for generating a visualization connection line, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

calculating an importance score for each scoring target within a plurality of scoring targets; and determining a connection line path between at least two related nodes among a plurality of nodes in a computer visualization based on the calculated importance score, wherein determining the connection line path further comprises:

calculating an original connection line path;

determining the original connection line path passes over a scoring target within the plurality of scoring targets;

identifying the scoring target over which the calculated original connection line path passes based on determining that the original connection line path passes over the scoring target;

determining the calculated importance score for the identified scoring target meets or exceeds a preconfigured threshold; and modifying the calculated original connection line path to avoid obscuring user readability of the identified scoring target.

8. The computer system of claim 7, wherein calculating the importance score further comprises:

extracting a plurality of node elements from the displayed plurality of nodes, wherein each node element within the plurality of node elements is a scoring target within the plurality of scoring targets;

determining a node element definition for each node element within the plurality of extracted node elements; and calculating the importance score for each scoring target within the plurality of scoring targets based on the determined node element definition type.

9. The computer system of claim 8, wherein the node element definition comprises at least one of a text-type node element, an image-type node element, and an other-type node element, and wherein the other-type node element comprises at least one of an enumeration constant, a status icon, and a number field.

10. The computer system of claim 9, wherein the node element definition within the extracted plurality of node elements is at least one of a text-type node element, an image-type node element, and an other-type node element, and wherein the plurality of scoring targets comprises at least one of a sentence, a word, a phrase, and a letter within the text-type node element.

11. The computer system of claim 10, wherein the text-type node element displays a plurality of characters comprising at least one of a sentence, a word, a phrase, a letter, and a number within the text-type node element, and wherein the image-type node element displays a file with a file extension associated with an image, and wherein the other-type node element displays a plurality of data that is not related to the text-type node element or the image-type node element.

12. The computer system of claim 7, wherein modifying the calculated original connection line path comprises at least one of circumventing the identified scoring target by a preconfigured distance, increasing a connection line transparency when the calculated original connection line path passes over the identified scoring target, reducing a display priority of the connection line, and drawing the original connection line path underneath the identified scoring target.

13. A computer program product for generating a visualization connection line, the computer program product comprising:

one or more computer-readable tangible storage medium and program instructions stored on at least one of the one or more tangible storage medium, the program instructions executable by a processor capable of performing a method, the method comprising:

calculating an importance score for each scoring target within a plurality of scoring targets; and determining a connection line path between at least two related nodes among a plurality of nodes in a computer visualization based on the calculated importance score, wherein determining the connection line path further comprises:

calculating an original connection line path;

determining the original connection line path passes over a scoring target within the plurality of scoring targets;

identifying the scoring target over which the calculated original connection line path passes based on determining that the original connection line path passes over the scoring target;

determining the calculated importance score for the identified scoring target meets or exceeds a preconfigured threshold; and modifying the calculated original connection line path to avoid obscuring user readability of the identified scoring target.

14. The computer program product of claim 13, wherein calculating the importance score further comprises:

extracting a plurality of node elements from the displayed plurality of nodes, wherein each node element within the plurality of node elements is a scoring target within the plurality of scoring targets;

determining a node element definition for each node element within the plurality of extracted node elements; and calculating the importance score for each scoring target within the plurality of scoring targets based on the determined node element definition type.

15. The computer program product of claim 14, wherein the node element definition comprises at least one of a text-type node element, an image-type node element, and an other-type node element, and wherein the other-type node element comprises at least one of an enumeration constant, a status icon, and a number field.

16. The computer program product of claim 15, wherein the node element definition within the extracted plurality of node elements is at least one of a text-type node element, an image-type node element, and an other-type node element, and wherein the plurality of scoring targets comprises at least one of a sentence, a word, a phrase, and a letter within the text-type node element.

17. The computer program product of claim 16, wherein the text-type node element displays a plurality of characters comprising at least one of a sentence, a word, a phrase, a letter, and a number within the text-type node element, and wherein the image-type node element displays a file with a file extension associated with an image, and wherein the other-type node element displays a plurality of data that is not related to the text-type node element or the image-type node element.

18. The computer program product of claim 13, wherein modifying the calculated original connection line path comprises at least one of circumventing the identified scoring target by a preconfigured distance, increasing a connection line transparency when the calculated original connection line path passes over the identified scoring target, reducing a display priority of the connection line, and drawing the original connection line path underneath the identified scoring target.

* * * * *